US010853307B2

(12) United States Patent
Hargrave et al.

(10) Patent No.: US 10,853,307 B2
(45) Date of Patent: Dec. 1, 2020

(54) SYSTEM AND METHOD FOR A HOST APPLICATION TO ACCESS AND VERIFY CONTENTS WITHIN NON-VOLATILE STORAGE OF AN INFORMATION HANDLING SYSTEM

(71) Applicant: DELL PRODUCTS, L.P., Round Rock, TX (US)

(72) Inventors: Jordan P. Hargrave, Austin, TX (US); William C. Edwards, Round Rock, TX (US); Terry Wayne Liles, Round Rock, TX (US); Wayne R. Weilnau, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 435 days.

(21) Appl. No.: 15/663,547

(22) Filed: Jul. 28, 2017

(65) Prior Publication Data

US 2019/0034382 A1    Jan. 31, 2019

(51) Int. Cl.

| G06F 15/16 | (2006.01) |
| G06F 15/173 | (2006.01) |
| G06F 3/06 | (2006.01) |
| G06F 21/79 | (2013.01) |
| H04L 29/08 | (2006.01) |
| G06F 12/1081 | (2016.01) |
| H04L 29/06 | (2006.01) |

(52) U.S. Cl.
CPC ........ *G06F 15/17331* (2013.01); *G06F 3/067* (2013.01); *G06F 3/0622* (2013.01); *G06F 3/0655* (2013.01); *G06F 3/0664* (2013.01); *G06F 3/0665* (2013.01); *G06F 21/79* (2013.01); *G06F 12/1081* (2013.01); *H04L 63/145* (2013.01); *H04L 67/1097* (2013.01)

(58) Field of Classification Search
CPC .................................. G06F 15/17331
USPC ........................................ 709/212
See application file for complete search history.

(56) References Cited

U.S. PATENT DOCUMENTS

| 8,156,086 B2* | 4/2012 | Lu ........................ G06F 11/1448 707/690 |
| 10,078,609 B1* | 9/2018 | Raju ..................... G06F 13/385 |
| 2004/0068522 A1* | 4/2004 | Daniels ................ G06F 3/0607 |
| 2009/0043830 A1* | 2/2009 | Lu ....................... G06F 11/1448 |
| 2009/0240717 A1* | 9/2009 | Mimatsu ............. G06F 11/0727 |
| 2013/0179624 A1* | 7/2013 | Lambert ............. G06F 12/0246 711/103 |

(Continued)

*Primary Examiner* — Hamza N Algibhah
(74) *Attorney, Agent, or Firm* — Isidore PLLC

(57) ABSTRACT

An information handling system (IHS) and a method for a host application to access and verify contents within all non-volatile storage of the IHS. The method utilizes an access controller that has access to non-volatile storage which cannot be directly accessed from a host operating system. The access controller, upon receiving a request from the host application to view contents in a non-volatile storage that is not accessible to the host application, copies the contents of the un-accessible non-volatile storage to a storage medium communicatively coupled to the access controller. The access controller then presents the storage medium as a virtual storage device to the host application, enabling the host application to access the copied contents of the un-accessible non-volatile storage.

16 Claims, 4 Drawing Sheets

(56) References Cited

U.S. PATENT DOCUMENTS

| | | | | |
|---|---|---|---|---|
| 2013/0232303 A1* | 9/2013 | Quan | ............... | G06F 12/08 |
| | | | | 711/118 |
| 2013/0238562 A1* | 9/2013 | Kumarasamy | ...... | G06F 9/45558 |
| | | | | 707/649 |
| 2013/0346709 A1* | 12/2013 | Wang | ............... | G06F 11/1456 |
| | | | | 711/162 |
| 2014/0046909 A1* | 2/2014 | Patiejunas | ......... | G06F 16/24554 |
| | | | | 707/687 |
| 2014/0108351 A1* | 4/2014 | Nallathambi | ....... | G06F 11/1451 |
| | | | | 707/639 |
| 2014/0108471 A1* | 4/2014 | Liu | ............... | G06F 16/192 |
| | | | | 707/823 |
| 2015/0242273 A1* | 8/2015 | Resch | ............... | G06F 21/62 |
| | | | | 714/763 |
| 2016/0358657 A1* | 12/2016 | Kim | ............... | G11C 16/10 |
| 2017/0075619 A1* | 3/2017 | Jones | ............... | G06F 3/0619 |
| 2017/0289152 A1* | 10/2017 | Bursell | ............... | H04L 63/0876 |
| 2017/0302742 A1* | 10/2017 | Zhou | ............... | H04L 29/08 |
| 2017/0316030 A1* | 11/2017 | Shetty | ............... | G06F 9/45558 |
| 2018/0004447 A1* | 1/2018 | Oohira | ............... | G06F 9/46 |
| 2018/0203997 A1* | 7/2018 | Charters | ............... | G06F 21/568 |
| 2018/0260351 A1* | 9/2018 | An | ............... | G06F 13/385 |
| 2018/0284986 A1* | 10/2018 | Bhagi | ............... | G06F 3/065 |
| 2018/0285202 A1* | 10/2018 | Bhagi | ............... | G06F 9/45558 |
| 2019/0034505 A1* | 1/2019 | Renauld | ............... | G06F 9/45558 |

* cited by examiner

SYSTEM AND METHOD FOR A HOST APPLICATION TO ACCESS AND VERIFY CONTENTS WITHIN NON-VOLATILE STORAGE OF AN INFORMATION HANDLING SYSTEM

BACKGROUND

1. Technical Field

The present disclosure generally relates to an information handling system and in particular to a system and method for a host application to access and verify contents within non-volatile storage of an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have to be attentive of ever increasing attacks from malicious software, for example malware. Malware is software designed to infiltrate an information handling system without the consent of a user or owner of the information handling system. Some examples of malware may include computer viruses, worms, Trojan horses, spyware, adware, root kits, and so forth. Malware may also include any undesirable code or software that diminishes performance, consumes resources, circumvents security, or otherwise impacts the operation of a computer system.

To maintain the security of an information handling system, a system administrator will want to access all non-volatile storage in the information handling system and verify that the content of the different non-volatile storage devices has not been compromised. Ideally, the system administrator would be able to directly access all the non-volatile storage utilizing an application in a host operating system. However, current hardware designs do not allow a host operating system of an information handling system to directly access all of the non-volatile storage within the information handling system.

BRIEF SUMMARY

Disclosed are a method and an information handling system (IHS) for a host application to access and verify contents within all non-volatile storage of the IHS. The present invention discloses a novel method that utilizes an access controller that has access to non-volatile storage which cannot be directly accessed from a host operating system. The access controller, upon receiving a request from the host application to view contents in a non-volatile storage that is not accessible to the host application, copies the contents of the un-accessible non-volatile storage to a storage medium communicatively coupled to the access controller. The access controller then presents the storage medium as a virtual storage device to the host application, enabling the host application to access the copied contents of the un-accessible non-volatile storage.

In another embodiment of the present invention, a first verification process is performed on the original contents of the un-accessible non-volatile storage employing a data integrity operation, such as a checksum or cyclic redundancy check. The resultant values from the data integrity operation are then saved in a secure database. In yet another embodiment, a second verification process is performed on the copied contents of the un-accessible non-volatile storage. The resultant values from the second verification process are compared to the values stored in the secure database to determine if the un-accessible non-volatile storage has been compromised.

According to another embodiment, the IHS includes an access controller and a device communicatively coupled to the access controller. The device has non-volatile storage that is not accessible to a host operating system. The IHS further includes system memory having stored thereon the host operating system and verification firmware. The IHS also includes a system processor that is communicatively coupled to both the system memory and the access controller. The system processor executes the verification firmware, which configures the system processor to forward, to the access controller, a request from a host application to view contents of the non-volatile storage of a flash device. The access controller, in response to receiving the request from the host application, proceeds to copy the contents of the device's non-volatile storage to a storage medium accessible to the access controller. The access controller then presents the storage medium as a virtual storage device to the host application, enabling the host application to access the copied contents of the un-accessible non-volatile storage.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
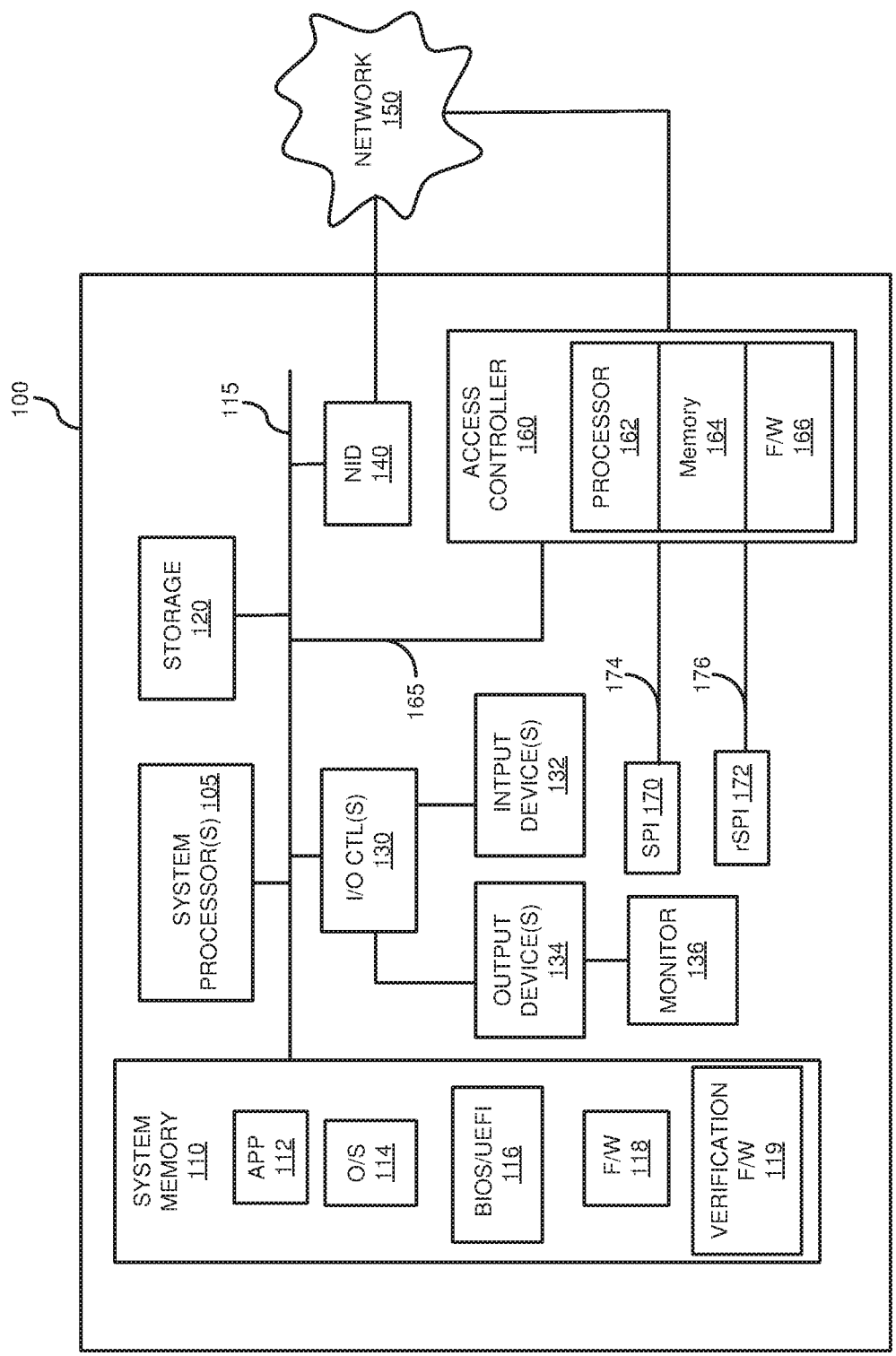
FIG. 1 illustrates a block diagram of an exemplary information handling system within which various aspects of the disclosure can be implemented, according to one or more embodiments.

As described previously hereinabove, current hardware designs do not allow a host operating system of an information handling system (IHS) to directly access all of the non-volatile storage within the IHS. IHS management controllers, such as remote access controllers (RAC) and baseboard management controllers (BMC), have access to additional non-volatile storage, such as a serial peripheral interface (SPI) and/or restore serial peripheral interface (rSPI) flash devices that cannot be directly accessed from the host operating system. According to one embodiment, these access controllers have access and control of associated non-volatile storage that they can emulate to a host operating system as a universal serial bus (USB) device.

The illustrative embodiments provide an information handling system (IHS) and a method for a host application to access and verify contents within all non-volatile storage of an information handling system. The present invention discloses a method whereby, in response to receiving, at an access controller, a request from the host application to view contents in a non-volatile storage that is not accessible to the host application, the access controller copies the contents of the un-accessible non-volatile storage to a storage medium communicatively coupled to the access controller. The access controller then presents the storage medium as a virtual storage device to the host application, enabling the host application to access the copied contents of the un-accessible non-volatile storage.

At the request of a host application, the access controller can copy the contents of a region of a non-volatile storage device, for example, the SPI and rSPI devices, to a region of the associated non-volatile storage, and the access controller then exposes the storage device to the host application as, in one embodiment, a USB storage device. The access controller in effect exposes an aperture, or window, into the contents of non-volatile storage devices, which are not directly accessible from the host operating system, but are accessible to the access controller. By using this aperture, a host application initially captures the original contents, or a checksum or a cyclic redundancy check (CRC) of the contents, etc, of the known good (verifiable) non-volatile storage devices during provisioning of the IHS, prior to the IHS deployment. These non-volatile storage devices can then be checked for tampering, malware, or other corruption, at a later time by repeating the process and comparing the newly retrieved values to the original contents, or the resulting original CRC, of the non-volatile storage devices.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software utility, and software components and basic configuration thereof depicted in the following figures may vary. For example, the illustrative components of IHS 100/200 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more system processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including host application(s) 112, host operating system (O/S) 114, basic input/output system/unified extensible firmware interface (BIOS/UEFI) 116 and other firmware (F/W) 118. System memory 110 further includes verification firmware 119, that, in another advantageous embodiment, can be an executable module of/within O/S 114 or host application 112. The various software and/or firmware modules, including verification firmware 119, have varying functionality when their corresponding program code is executed by system processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor 136, or other display device(s), and/or audio speaker(s).

IHS 100 further comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols. In one embodiment, a customer provisioned system/platform may comprise multiple devices located across a distributed network, and NID 140 enables IHS 100 to be connected to these other devices. Network 150 can be a local area network, wide area network, personal area network, and the like, and the connection to and/or between network and IHS 100 can be wired or wireless or a combination thereof. For purposes of discussion, Network 150 is indicated as a single collective component for simplicity. However, it is appreciated that network 150 can comprise one or more direct connections to other devices as well as a more complex set of interconnections as can exist within a wide area network, such as the Internet.

IHS 100 further includes an access controller 160 that is communicatively coupled to system interconnect 115 through a management bus 165. In an advantageous embodiment, access controller 160 is a remote access controller, for example, a Dell Remote Access Controller (DRAC) that is an out-of-band management platform and provides a browser-based or command-line interface (or both) for managing and monitoring IHS 100 hardware. As depicted, access controller 160 includes a processor 162, a memory 164, access controller firmware 166 and a dedicated network connection to network 150. Access controller 160 utilizes an Intelligent Platform Management Interface (IPMI) standard to communicate with the host operating system 114 and other systems, and/or components, of IHS 100. As it is well known to those skilled in the art, IPMI is an industry standard for system monitoring and event recovery. The IPMI specification provides a common message-based interface for accessing all of the manageable features in IHS 100.

In another embodiment, access controller 160 is integrated within a management processer (not shown), such as a baseboard management controller (BMC). A baseboard management controller (BMC) is a microcontroller that monitors the health and operation of the IHS 100. The BMC generally monitors health-related aspects associated with the IHS 100 such as the temperature of components, the speed of rotational components (e.g., spindle motor, CPU fan), etc. within the IHS 100.

IHS 100 further comprises first and second devices 170, 172, respectively, that are communicatively coupled directly to access controller 160 through respective first and second serial buses 174, 176. In an advantageous embodiment, first device 170 is a serial peripheral interface (SPI) device, such as a secure digital (SD) card and second device 172 is a restore Serial Peripheral Interface (rSPI) flash memory device generally utilized to store information about the IHS 100, such as Service Tag, system configuration, or access controller license. It should be noted that first and second devices 170, 172 are not directly accessible by host operating system 114. It should be readily apparent to those of ordinary skill in the art that first and second devices 170, 172, are just two examples of non-volatile storage devices un-accessible to host operating system 114. The disclosure functionality, however, extends to other types of storage devices that are not accessible by host operating system 114 but can be accessed by access controller 160.

Figure 2:
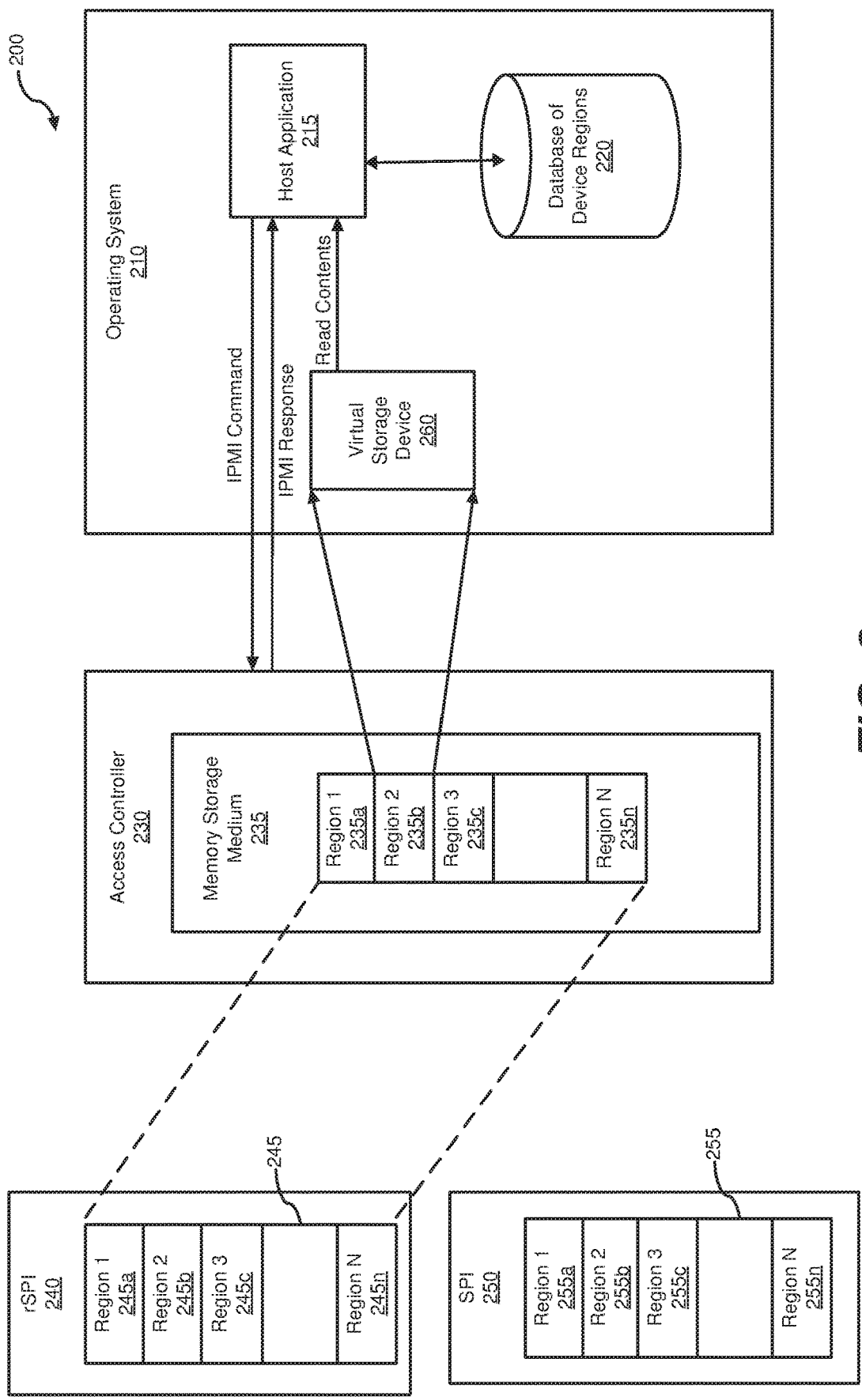
FIG. 2 illustrates a block diagram of exemplary components of the example information handling system, in accordance with one embodiment.

With reference now to FIG. 2, and with continuing reference to FIG. 1, there is illustrated a block diagram of select components of an exemplary information handling system (IHS) 200, in accordance with one embodiment. IHS 200, which is comparable to IHS 100, includes a host operating system 210 and an access controller 230. It should be noted that although the practice of the present disclosure will be described with the utilization of a remote access controller, e.g., DRAC, other controllers, such as a BMC, which has access to non-volatile storage that are not accessible to a host operating system, may be employed in other advantageous embodiments. Operating system 210 includes a host application 215 coupled to a secure database 220 and a virtual storage device 260 that emulates a mass storage device, such as a compact disc read-only memory (CD- ROM) device. Access controller 230 comprises memory storage medium 235 with a plurality of partition memory regions 235a-235n. In one embodiment, storage medium 235 is an embedded Multi-Media Controller (eMMC). IHS 200 further includes first and second devices 240, 250, respectively. First and second devices 240, 250 include non-volatile storage 245 and 255, respectively. Non-volatile storage 245 and 255 are, in turn, depicted with each having a plurality of partition memory regions 245a-245n and 255a-255n, respectively. The plurality of memory regions 245a-245n and 255a-255n of first and second devices 240 and 250 are accessible to the access controller 230 and not directly accessible by the host operating system 210.

Figure 3:
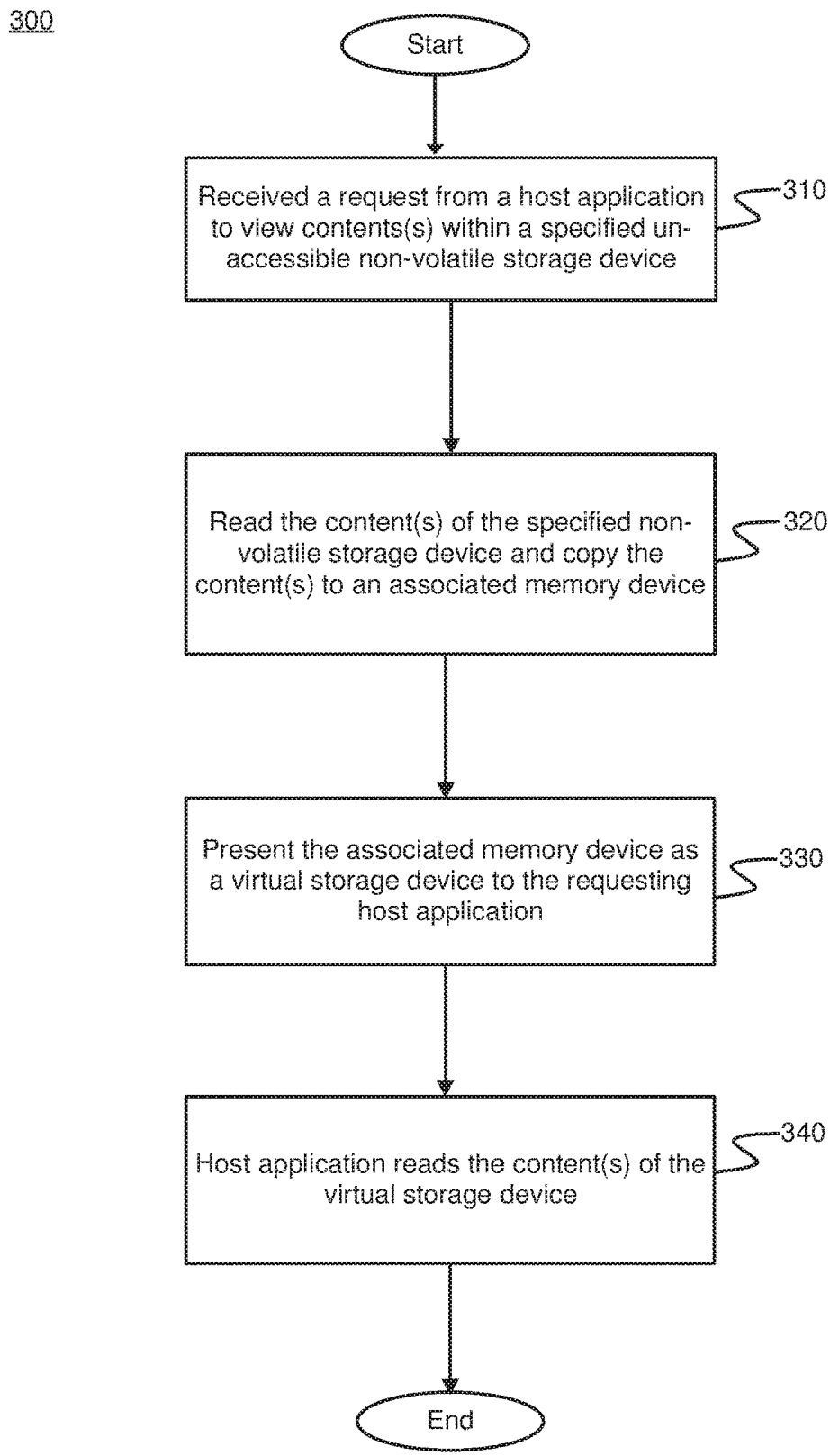
FIG. 3 is a flow chart illustrating an exemplary process flow of a method for a host application to view contents of non-volatile storage of an un-accessible device, in accordance with one embodiment.
Figure 4:
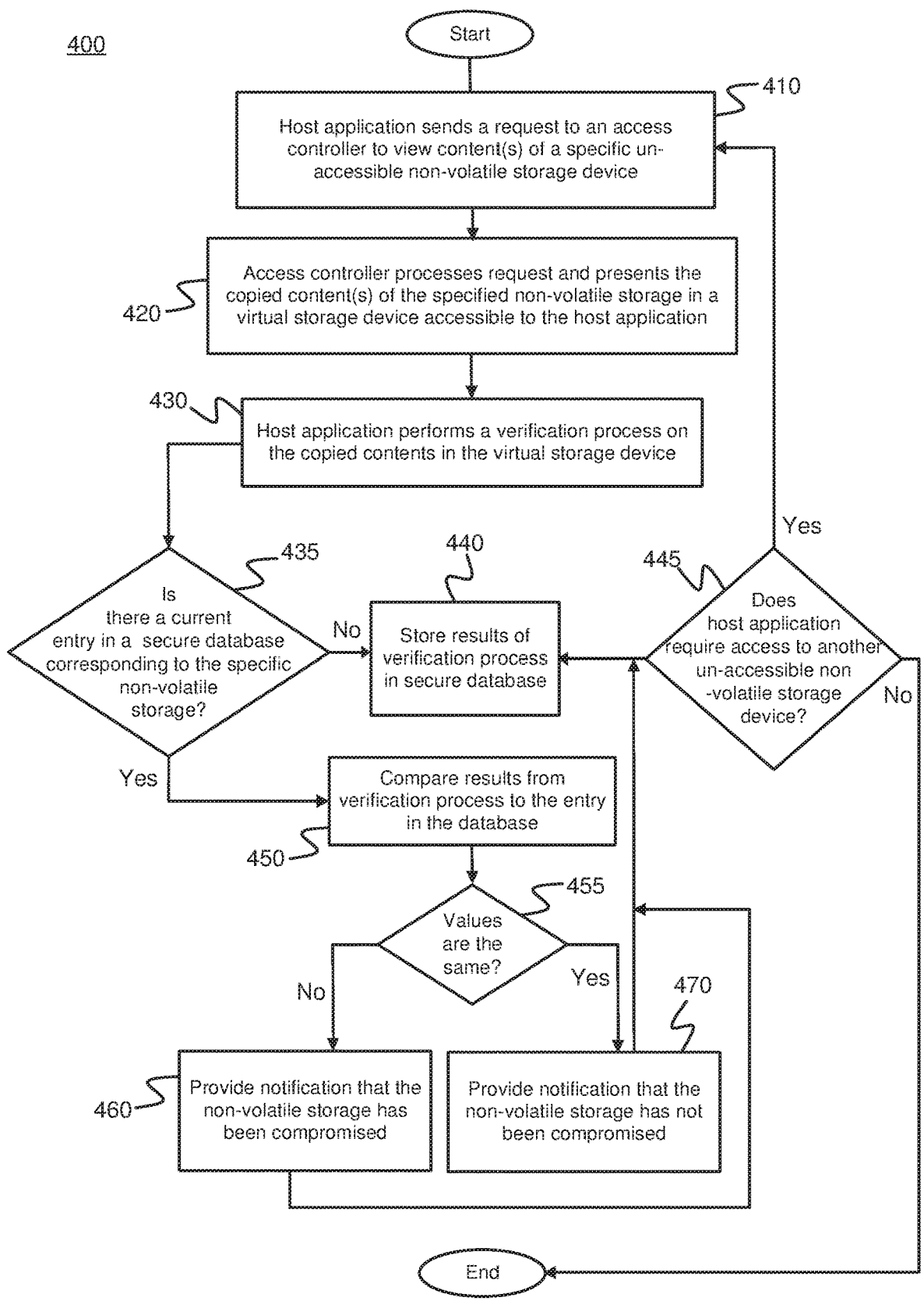
FIG. 4 is a flow chart illustrating an exemplary process flow of a method for a host application to access and verify contents within non-volatile storage of an information handling system according to one or more embodiments.

FIGS. 3 and 4 illustrate flowcharts of exemplary methods 300 and 400 by which the system processor 105 and the access controller processor 162 within the preceding figures execute code that enables the processors and/or IHS to perform different aspects of the processes providing the one or more embodiments of the disclosure. In particular, methods 300 and 400 represent computer-implemented methods for a host application to view contents of non-volatile storage of an un-accessible storage device and for a host application to access and verify contents within non-volatile storage of an information handling system, respectively. The description of methods 300 and 400 are provided with general reference to the specific components illustrated within the preceding FIGS. 1-2. Generally, methods 300 and 400 are described as being implemented via system processor 105 and processor 162 of access controller 160 and particularly the execution of code provided by verification F/W 119 and access controller F/W 166. It is however appreciated that certain aspects of the described methods may be implemented via other processing devices and/or execution of other code.

Referring now to the flow charts and specifically to FIG. 3, method 300 begins at the start block and proceeds to block 310 where host application 215 initiates a process to view the contents, specifically memory region 245b, of first device 240. It should be readily apparent to those of ordinary skill in the art that, in other advantageous embodiments, host application 215 may request to view all or a specific number of memory regions of first device 240. However, as discussed previously hereinabove, host operating system 210 cannot directly access the non-volatile storage of first device 240. Instead, host application 215 sends an IPMI command to access controller 230 to expose the specific memory region 245b of first device 240. Host application 215 also requests access controller 230 to create temporary storage, i.e., the plurality of partition memory regions 235a-235n, within memory storage medium 235.

In response to receiving the request from host application 215 to view the contents within a specified un-accessible non-volatile storage device, access controller 230 proceeds to read the contents in memory region 245b and subsequently copies the contents from the storage device to memory region 235b in memory storage medium 235 associated with access controller 230 (block 320). Host application 215 monitors the process of copying the desired non-volatile content to memory storage medium 235 to completion. In another advantageous embodiment, host application 215 may initiate copying the desired non-volatile content to network storage accessible by access controller 230.

At block 330, host application 215 requests access controller 230 to expose, or attach, the temporary storage, i.e., plurality of partition memory regions 235a-235n, to host application 215. In one embodiment, access controller 230 presents memory storage medium 235 as an emulated virtual storage device 260 which functions as a virtual universal serial bus (USB) mass storage device for host application 215. The virtual storage device 260 emulating a USB mass storage, i.e., USB drive, is attached to host application 215 through a USB driver as a hot plug event. It should be readily apparent to those of ordinary skill in the art that depending on host operating system 210, host application 215 may need to mount virtual storage device 260 (USB drive).

At block 340, host application 215 reads virtual storage device 260 which contains a copy of un-accessible memory region 245b. Upon completion, the host application 215 will detach, i.e., eject, the virtual storage device 260 and instruct the access controller 230 to release the virtual storage device 260, or temporary storage. Method 300 then proceeds to terminate at the end block.

Turning now to FIG. 4, illustrated is a flow chart illustrating an exemplary process flow of a method 400 for a host application to access and verify contents within non-volatile storage of an information handling system according to one or more embodiments. As discussed previously hereinabove, information handling systems are prime targets for malicious software attacks. One approach to combating malicious software attacks, in one embodiment, is to provide a suitable controlled computing environment that simulates a real-world information handling system, for example, a financial transactional system. It should be noted that the disclosed method is not limited to simulated systems. In other advantageous embodiments, the methods in this disclosure can also be applied to real-world operational systems. These real-world simulated systems can then be subjected to attacks utilizing known malware to test if the simulated system malware detection and protection protocols can counter these malware attacks. Knowing the initial condition, i.e., contents, of all the information handling system's non-volatile storage at pre-deployment of the simulation process is necessary because the initial condition can then be compared with the contents of all the non-volatile storage at a later time or at the end of the simulation process, or post-deployment, to ensure that the IHS non-volatile storage devices have not been compromised. This method maintains the integrity of the information handling system.

Method 400 is initiated at a start block, which may be at pre-deployment or post-deployment of information handling system 200, for example, a financial operational system. In another embodiment, method 400 is initiated when IHS 200 is first provisioned at, or prior to, initial delivery to a customer/user. At block 410, host application 215, i.e., a malware detection application, sends an IPMI command to the access controller 230 to view contents at the first device 240, i.e., an un-accessible non-volatile storage device. At block 420, access controller 230 executes the process flow of method 300 described previously and presents copies of the requested contents of the plurality of memory regions 245a-245n within the virtual storage device 260.

At block 430, host application 215 reads and performs a data verification process on the copied contents in virtual storage device 260. In an advantageous embodiment, the data verification process is a cyclic redundancy check (CRC) of the data associated with each of the plurality of memory regions 245a-245n. Alternatively, in other embodiments, a checksum data verification methodology may be advantageously employed. Subsequently, at decision block 435, the host application 215 determines if there are original CRC data entries in the secure database 220 that corresponds to each of the plurality of memory regions 245a-245n. If it is determined that there are corresponding CRC data associated with each of the plurality of memory regions 245a-245n, which would be the case where host application 215 is in its post-deployment phase or at any time following the initial execution (pre-deployment) of the host application 215, method 400 proceeds to block 450. At block 450, host application 215 compares the resultant CRC values from the data verification process to their original associated CRC values corresponding to the plurality of memory regions 245a-245n in the secure database 220.

At decision block 455, if it is determined that the resultant CRC values from the data verification process and their associated original CRC values (in the secure database 220) corresponding to the plurality of memory regions 245a-245n are the same, a notification is generated, at block 470, to indicate that non-volatile storage of first device 240 has not been compromised. On the other hand, if it is determined, at decision block 455, that the resultant CRC values from the data verification process and their associated original CRC values corresponding to the plurality of memory regions 245a-245n contain at least one discrepancy, a notification is generated, at block 460, to indicate that the content within non-volatile storage of first device 240 has been compromised. Subsequently, after generating a notification that first device 240 has, or alternatively, has not been compromised, method 400 proceeds to a determining step 445.

Referring back to decision block 435, if it is determined that there are no corresponding CRC data associated with each of the plurality of memory regions 245a-245n in the secure database 220, method 400 proceeds to block 440 where host application 215 proceeds to store the CRC data associated with each of the plurality of memory regions 245a-245n in secure database 220. In one embodiment, the absence of any CRC data associated with each of the plurality of memory regions 245a-245n in secure database 220 is an indication that IHS 200 is in a pre-deployment setup phase. Following which, method 400 proceeds to determining step 445.

At decision block 445, method 400 determines if host application 215 requires access to another un-accessible non-volatile storage device within IHS 200, such as second device 250. If there is a determination that there is another un-accessible non-volatile storage device that needs to be accessed, the process, i.e., blocks 410 through decision block 445, is repeated for each additional un-accessible non-volatile storage device. On the other hand, following a determination at decision block 445 that there are no more un-accessible non-volatile storage devices required to be accessed by the host application 215, method 400 is terminated at the end block.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for a host operating system to access and verify contents within non-volatile storage of an information handling system (IHS), the method comprising:
    receiving, at an access controller, (i) an Intelligent Platform Management Interface (IPMI) command generated by a host application to expose specific memory regions and view contents in the specific memory regions of a secure non-volatile storage, the non-volatile storage having a plurality of partition memory regions that are not directly accessible to the host operating system but are accessible to the access controller and (ii) a request for the access controller to create temporary storage within a memory storage medium;
    in response to the request, copying, by the access controller, the contents of the un-accessible non-volatile storage to the memory storage medium communicatively coupled to the access controller;
    performing a verification process to determine if the copied contents on the memory storage medium is similar to an original content;
    in response to determining that the copied contents of the memory storage medium have changed, generating a notification that the contents of the un-accessible non-volatile storage have been compromised; and
    presenting, by the access controller, the memory storage medium as an emulated virtual storage device to the host application, enabling the host application to access and read the copied contents of the non-volatile storage, the host application subsequently detaching from the emulated virtual storage device on completion of the read of the copied contents of the un-accessible non-volatile storage and releasing the emulated virtual storage device.

2. The method of claim 1, further comprising:
    performing a first verification process on the copied contents of the storage medium at pre-deployment of the host application, the first verification process comprising:
    determining if there are original cyclic redundancy check (CRC) data entries in a non-volatile secure storage that corresponds to each of the plurality of memory regions; and
    in response to determining that there are corresponding CRC data associated with each of the plurality of memory regions in the non-volatile secure storage, storing, by the host processor, CRC data associated with the first verification process in the non-volatile secure storage.

3. The method of claim 2, further comprising:
    in response to determining that there are corresponding CRC data associated with each of the plurality of memory regions in the non-volatile secure storage, performing a second verification process on the copied contents of the storage medium, the second verification process comprising:
    comparing resultant CRC values from the first and second verification processes to determine if the contents of the non-volatile storage have been compromised.

4. The method of claim 3, wherein the first and second verification processes utilizes a data integrity algorithm.

5. The method of claim 4, wherein the data integrity algorithm is a cyclic redundancy check.

6. The method of claim 1, wherein the memory storage medium is an embedded Multi-Media Controller (eMMC).

7. The method of claim 1, wherein the un-accessible non-volatile storage is a restore serial peripheral interface (rSPI) device.

8. The method of claim 1, wherein the virtual storage device is a virtual universal serial bus (USB) device.

9. An information handling system (IHS) comprising:
    an access controller;
    at least one device communicatively coupled to the access controller and having secure non-volatile storage having a plurality of partition memory regions that are not accessible to a host operating system but are accessible to the access controller;

a system memory having stored thereon the host operating system and verification firmware; and a system processor communicatively coupled to the system memory and the access controller, the system processor executing the verification firmware which configures the system processor to:

forward to the access controller, (i) an Intelligent Platform Management Interface (IPMI) command from a host application to expose specific memory regions and view contents in the specific memory regions of the secure non-volatile storage of the device, and (ii) a request for the access controller to create temporary storage within a memory storage medium; and wherein, in response to receiving the request from the host application, the access controller:

copies the contents of the device non-volatile storage to a storage medium accessible to the access controller;

performs a verification process to determine if the copied contents on the memory storage medium is similar to an original content;

in response to determining that the copied contents in the memory storage medium have changed, generate a notification that the contents of the un-accessible non-volatile storage have been compromised; and presents the memory storage medium as an emulated virtual storage device to the host application, enabling the host application to have access to read the copied contents of the non-volatile storage; and detach the host application from the emulated virtual storage device on completion of the read of the copied contents of the un-accessible non-volatile storage and release the emulated virtual storage device.

10. The IHS of claim 9, wherein the verification firmware further configures the system processor to:

perform a first verification process on the copied contents of the storage medium at pre-deployment of the host application, the first verification process comprising the verification firmware configuring the processor to:

determine if there are original cyclic redundancy check (CRC) data entries in a non-volatile secure storage that corresponds to each of the plurality of memory regions; and in response to determining that there are corresponding CRC data associated with each of the plurality of memory regions in the non-volatile secure storage, store CRC data associated with the first verification process in the non-volatile secure storage.

11. The IHS of claim 10, wherein the verification firmware further configures the system processor to:

in response to determining that there are corresponding CRC data associated with each of the plurality of memory regions in the non-volatile secure storage, perform a second verification process on the copied contents of the storage medium, the second verification process comprising:

comparing resultant CRC values from the first and second verification processes to determine if the contents of the non-volatile storage have been compromised.

12. The IHS of claim 11, wherein the first and second verification processes utilizes a data integrity algorithm.

13. The IHS of claim 12, wherein the data integrity algorithm is a cyclic redundancy check.

14. The IHS of claim 9, wherein the memory storage medium is an embedded Multi-Media Controller (eMMC).

15. The IHS of claim 9, wherein the device is a restore serial peripheral interface (rSPI) device.

16. The IHS of claim 9, wherein the virtual storage device is a virtual universal serial bus (USB) device.

\* \* \* \* \*